United States Patent [19]

Mitobe

[11] Patent Number: 4,832,363
[45] Date of Patent: May 23, 1989

[54] INDEPENDENT REAR WHEEL SUSPENSION

[75] Inventor: Keiichi Mitobe, Saitama, Japan

[73] Assignee: Honda Giken Kogyo Kabushiki Kaisha, Tokyo, Japan

[21] Appl. No.: 214,863

[22] Filed: Jul. 1, 1988

Related U.S. Application Data

[63] Continuation of Ser. No. 913,212, Sep. 29, 1986, abandoned.

[30] Foreign Application Priority Data

Oct. 4, 1985 [JP] Japan .................. 60-221488
Oct. 4, 1985 [JP] Japan .................. 60-221489

[51] Int. Cl.⁴ ............................. B60G 3/26
[52] U.S. Cl. .................................. 280/690
[58] Field of Search ........... 280/690, 700, 701, 697; 180/73.3, 73.4

[56] References Cited

U.S. PATENT DOCUMENTS 4,269,432  5/1981  Inoue et al. .................. 280/690

FOREIGN PATENT DOCUMENTS

| 136563 | 4/1985 | European Pat. Off. ......... 280/701 |
| 0193089 | 9/1986 | European Pat. Off. . |
| 2552374 | 3/1985 | France . |
| 76313 | 5/1983 | Japan .................. 280/701 |
| 60-67205 | 4/1985 | Japan . |
| 116513 | 6/1985 | Japan .................. 280/690 |
| 2087322 | 5/1982 | United Kingdom . |
| 2089743 | 6/1982 | United Kingdom . |
| 2147553 | 5/1985 | United Kingdom . |

Primary Examiner—Charles A. Marmor
Assistant Examiner—Ross Weaver
Attorney, Agent, or Firm—Irving M. Weiner; Joseph P. Carrier; Pamela S. Burt

[57] ABSTRACT

An independent rear wheel suspension (100; 100') for a vehicle in which a knuckle (1) rotatably supporting a rear wheel (2) of the vehicle is pivotably connected in a vertically movable manner to the vehicle body by means of a substantially longitudinally extending trailing arm (5), a substantially transversely extending upper arm (3), a substantially transversely extending short front lower arm (6), and a substantially transversely extending long rear lower arm (4). The knuckle (1) is vertically swingingly pivotably attached to the upper arm (3) and the rear lower arm (4). The upper arm (3), trailing arm (5), front lower arm (6), and rear lower arm (4) are vertically swingingly pivotably attached to the vehicle body. The knuckle (1) is leftwardly and rightwardly swingingly pivotably attached to the trailing arm (5) so as to rotate about a substantially vertical axis (12–14) extending through the rear end part (A) of the trailing arm (5). The operative pivotal point (B) between the knuckle (1) and the front lower arm (6) is offset in the longitudinal direction of the vehicle with respect to the pivotal point (A) between the knuckle (1) and the trailing arm (5). The outer end part (B) of the front lower arm (6) is vertically swingingly pivotably attached to the trailing arm (5).

6 Claims, 4 Drawing Sheets

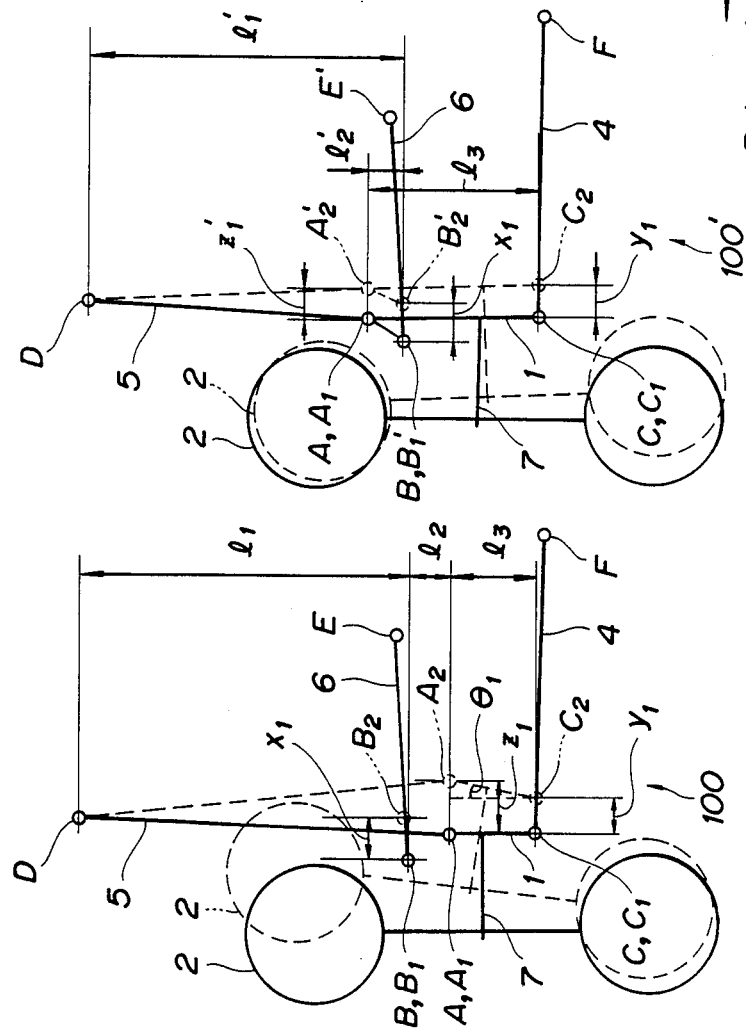

INDEPENDENT REAR WHEEL SUSPENSION

This is a continuation of application Ser. No. 913,212 filed Sept. 29, 1986 now abandoned.

BACKGROUND OF THE INVENTION

1. Field of the Invention

The present invention relates generally to rear wheel suspension systems for vehicles and more particularly to an independent rear wheel suspension for vehicles.

2. Description of Relevant Art

In vehicles with some of the conventional independent rear wheel suspension systems of double Wishbone type there has been an unfavorable characteristic that the rear wheels tend to toe out when they bump and rebound. The present applicant has disclosed an independent rear wheel suspension which can eliminate such shortcoming, in UK Patent Application Publication No. GB A 2147553, published May 15, 1985. In this suspension, a knuckle which supports one of the rear wheels of a vehicle is pivotably attached in a vertically movable manner to a side of the vehicle body by using a trailing arm extending in the longitudinal direction of the vehicle, a long rear lower arm extending in the transverse direction of the vehicle, a short front lower arm arranged in front of the rear lower arm, substantially in parallel therewith, and an upper arm. The front lower arm functions as a compensation link. The trailing arm consists of a member, like a plate spring, this is at least partially sufficiently resilient in the transverse direction of the vehicle and highly rigid in the vertical direction thereof. By such suspension system, the rear wheels are adapted to toe in when they bump and rebound.

Moreover, in Japanese Patent Application Lay-Open Print No. 60-67205, laid open Apr. 17, 1985, the present applicant has proposed an independent rear wheel suspension which resembles the suspension of the above UK Publication and includes a front lower arm shorter than a rear lower arm. According to this Japanese Lay-Open Print, the short front lower arm permits a sufficient space to be secured for installation of a fuel tank in the rear part of a vehicle.

In the UK Publication above, when bumping and rebounding, the rear wheels tend to have their vibrations transmitted to a passenger accommodating space within the vehicle via the trailing and front and lower arms disposed near to the passenger space. The trailing arm and front lower arm as well as the upper arm and rear lower arm are, therefore, pivotably connected to the vehicle body side through elastic members, respectively.

The rear wheel toe angle characteristic depends on the rigidity of the trailing arm and the dimensions and installed positions of the lower arms. With respect to the toe angle characterisitc, there is a desideratum for increased freedom of design.

A further disadvantage of the suspension disclosed in the UK Publication above is the fact that the trailing arm is secured to the knuckle and hence, in the transverse direction of the vehicle in which it is resilient, its sympathetic vibration may sometimes be insufficiently controlled to maintain a comfortable ride. In this respect, there is a desideratum for effective control of such vibration of the trailing arm as well as for an enhanced riding comfort.

Similar disiderata are found also in the Japanese Lay-Open Print described.

The present invention has been achieved to provide an improved independent rear wheel suspension with respect to such desiderata in the UK Publication and Japanese Lay-Open Print as described.

SUMMARY OF THE INVENTION

An object of the present invention is to provide an independent rear wheel suspension in which a knuckle supporting a rear wheel of a vehicle is pivotably attached in a vertically movable manner to the vehicle body by using a trailing arm, a short front lower arm, and a long rear lower arm, while permitting an increased freedom in design of the rear wheel toe angle characteristic.

Another object of the present invention is to provide an independent rear wheel suspension which can effect a sufficient control of the trailing arm's sympathetic vibration in the transverse direction of the vehicle to thereby permit an enhanced riding comfort.

To achieve such object, the present invention provides an independent rear wheel suspension for a vehicle comprising a trailing arm extending substantially in the longitudinal direction of the vehicle and vertically swingingly pivotably attached at a front end part thereof to a body of the vehicle, a knuckle connected to a rear end part of the trailing arm and rotatably supporting a rear wheel of the vehicle, an upper arm extending substantially swingingly pivotably attached at an inner end part thereof to the vehicle body and at an outer end part thereof to an upper part of the knuckle, a rear lower arm extending substantially in the transverse direction of the vehicle and vertically swingingly pivotably attached at an inner end part thereof to the vehicle body and at an outer end part thereof to the knuckle, a front lower arm extending, in front of the rear lower arm, substantially in the transverse direction of the vehicle and vertically swingingly pivotably attached at an inner end part thereof to the vehicle body and at an outer end part thereof in an operative manner to the knuckle, the front lower arm being shorter than the rear lower arm, and a shock absorber operatively interposed between the knuckle and the vehicle body. Also, the knuckle is leftwardly and rightwardly swingingly pivotably attached to the trailing arm so as to rotate about a substantially vertical axis extending through the rear end part of the trailing arm, and the operative pivotal point between the knuckle and the front lower arm is offset in the longitudinal direction of the vehicle with respect to the pivotal point between the knuckle and the trailing arm.

Preferably, the rear end part of the front lower arm is vertically swingingly pivotably attached to the trailing arm.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

FIG. 7 is a schematically represented plan view of the suspension of FIG. 1.

FIG. 8 is a schematically represented plan view of an independent rear wheel suspension according to a modified example of the embodiment of FIG. 1.

FIGS. 9 and 10 are graphs showing rear wheel toe angle characteristics of the suspension represented by FIGS. 7 and 8, respectively.

DETAILED DESCRIPTION OF THE PREFERRED EMBODIMENT

Figure 2:
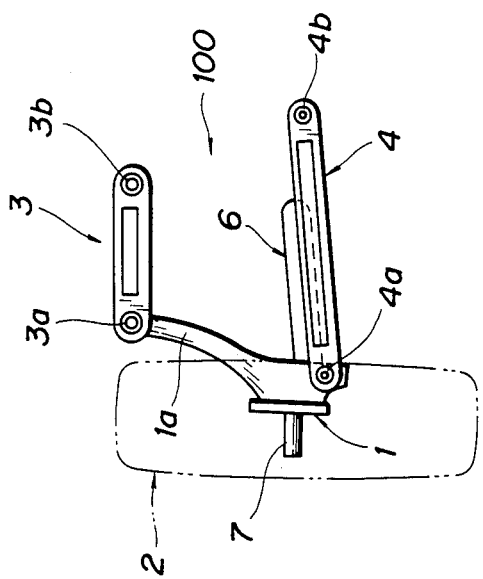
FIGS. 2 through 4 are rear, side, and plan views of the suspension of FIG. 1, respectively.

Referring now to FIGS. 1 to 4, designated at reference numeral 100 is an independent rear wheel suspension according to a preferred embodiment of the present invention, which is disposed at the rear left of an unshown vehicle. At the rear right of the vehicle is disposed another rear wheel suspension (not shown) having a symmetrical structure to the suspension 100. Hereinafter, the longitudinal and transverse directions of the vehicle will sometimes be simply referred to as longitudinal and transverse directions, respectively.

The rear wheel suspension 100 includes a knuckle 1 which has a rear axle 7 projected from the outer side part thereof to rotatably support a left rear wheel 2 of the vehicle. Between the inner side part of knuckle 1 and a body (not shown) of the vehicle there is interposed a shock absorber (not shown). The knuckle 1 has a substantially upwardly extending arm part 1a. The upper end of the arm part 1a is pivotably attached, via a rubber bush 3a fixed on a collar with its axis substantially longitudinally directed, to the outer end of a substantially transversely extending upper arm 3. The rear part of knuckle 1 is pivotably attached, via a rubber bush 4a fixed on a collar with its axis substantially longitudinally directed, to the outer end of a substantially transversely extending long rear lower arm 4. The front part of knuckle is formed with a bifurcate portion having an upper branch 1b and a lower branch 1c. The branches 1b, 1c are pivotably attached to upper and lower branches 5a, 5b of a bifurcate rear portion of a substantially longitudinally extending trailing arm 5, respectively, via rubber bushes 13, 15 which are fixed on collars and have their axes substantially vertically directed to be colinear to each other. In other words, a rear end part of the trailing arm 5 is connected to the knuckle 1 with a span 12a–14a in a vertical direction. By such interconnection, knuckle 1 and trailing arm 5 are each respectively permitted to leftwardly and rightwardly swing so as to rotate about a substantially vertical common axis of the bushes 13, 15.

Figure 6:
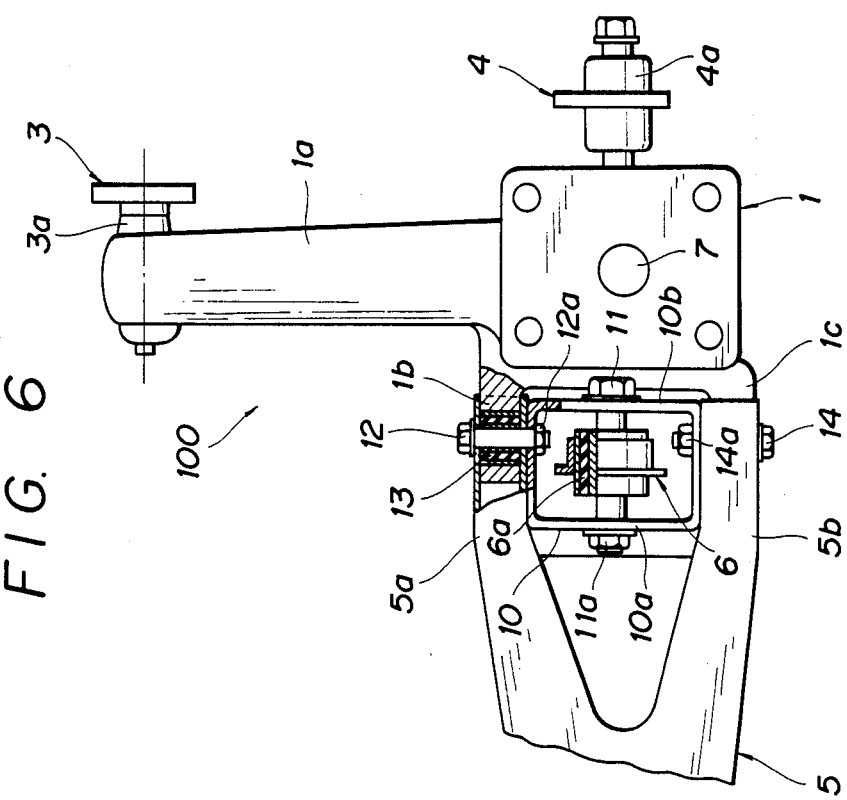
FIGS. 5 and 6 are enlarged perspective and partially sectional side views, respectively, of a connection between a knuckle and a trailing arm of the suspension of FIG. 1.
Figure 5:
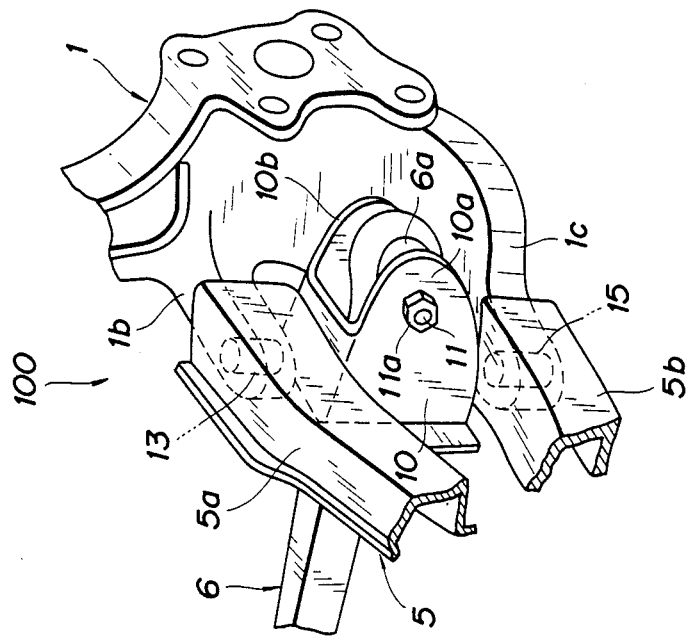

As shown in FIGS. 5 and 6, upper and lower branches 5a, 5b of the bifurcate rear portion of trailing arm 5 have channel-like sections opening inwardly of the vehicle body, respectively. The upper and lower branches 1b, 1c of knuckle 1 are fitted inn the channel-like upper and lower branches 5a, 5b, respectively. Between the lower surface of upper branch 5a and the upper surface of lower branch 5b is fitted a fixing member 10 which is quadrangular in side view. The upper surface of member 10 is secured to the branch 5a by means of a bolt 12 and a nut 12a which are employed for the pivotal connection between branches 1b, 5a. The lower surface of member 10 is secured to the branch 5b by means of a bolt 14 and a nut 14a which are employed for the pivotal connection between branches 1c, 5b. The bolts 12, 14 have axes thereof arranged colinearly to each other. By such interconnection, the member 10 is fixed to the trailing arm 5.

Figure 1:
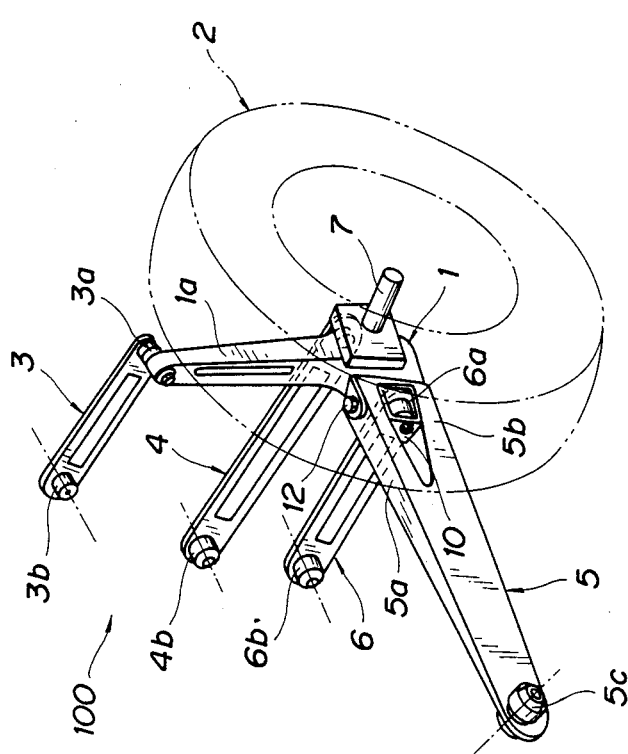
FIG. 1 is a perspective view of an independent rear wheel suspension according to a preferred embodiment of the present invention.
Figure 4:
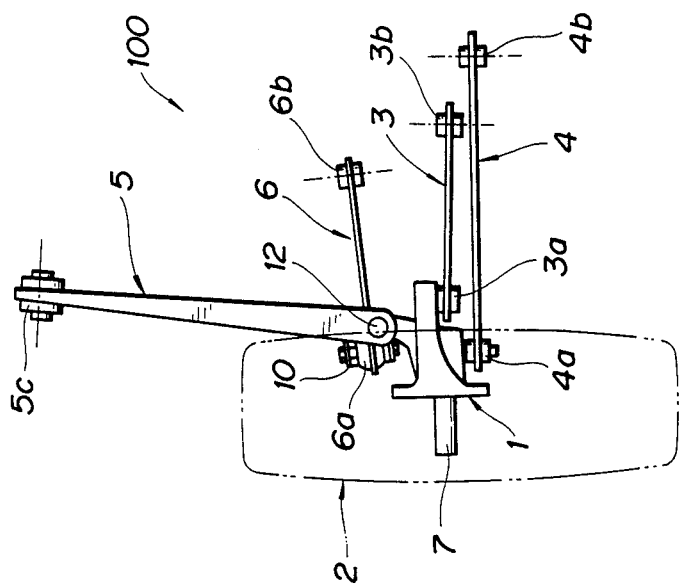
Figure 3:
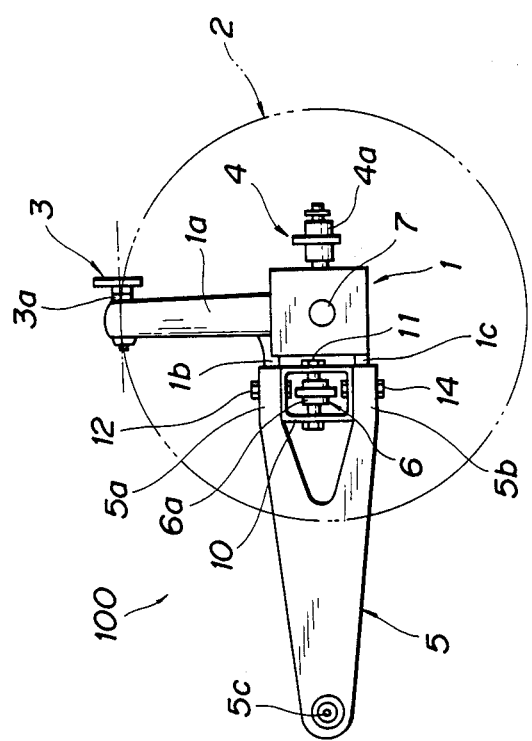

Transversely outwardly from the outer surfaces of the branches 5a, 5b of trailing arm 5 there is provided a bolt 11, the axis of which extends longitudinally. The fixing member 10 has front and rear side parts 10a, 10b thereof fastened to each other by the bolt 11 which is inserted therethrough and tightened by a nut 11a. A substantially transversely extending front lower arm 6 is pivotably attached at the outer end thereof, via a rubber bush 6a fixed on a collar and to the rear part of the trailing arm 5. The arm 6 is thus operatively pivotably connected to the knuckle 1. The front lower arm 6 is shorter than the rear lower arm 4, while they are arranged substantially parallel to each other. As shown in FIGS. 1 and 4, each of the upper arm 3, the lower arm 4 and the front lower arm 6 has an "I" shape in plan view.

The front end of trailing arm 5 is pivotably attached to the vehicle body, via a rubber bush 5c fixed on a collar with its axis substantially transversely directed. The respective inner ends of upper arm 3, rear lower arm 4, and front lower arm 6 are vertically swingingly pivotably attached to the vehicle body side, via rubber bushes 3b, 4b, 6b, respectively fixed on the collars with their axes substantially longitudinally directed.

Each rubber bush 3a, 3b, 4a, 4b, 5c, 6a, 6b is so adapted that two members thereby mutually interconnected are each respectively swingable not only within a predetermined angular range about the axis of the rubber bush, but also slightly in a plane including the rubber bush's axis and the axis of either member. For example, the rubber bush 5c which interconnects the front end of trailing arm 5 to the vehicle body has such a characterictic that the trailing arm 5 is swingable about the bush 5c on the vehicle body not only clockwise and counterclockwise in FIG. 3 to a predetermined angular position, but also clockwise and counterclockwise in FIG. 4 within a slight angular range. In this case, the vehicle body is a stationary member.

The rubber bush 6a as a pivotal point between the outer end of front lower arm 6 and the rear part of trailing arm 5, is positioned forwardly in plan view, with respect to the bolts 12, 14, which act as pivotal points between the bifurcate rear portion of trailing arm 5 and the bifurcate front portion of knuckle 1. In other words, the front lower arm 6 and the pivotal point 6a are forwardly offset in the longitudinal direction with respect to the pivotal points 12, 14.

FIG. 7 is a schematically represented plan view of the independent rear wheel suspension 100. In this Figure, represented by:

A is the position of a pivotal point between the trailing arm 5 and the knuckle 1;

B is the position of a pivotal point between the trailing arm 5 and the front lower arm 6;

C is the position of a pivotal point between the knuckle 1 and the rear lower arm 4;

D, E, and F are the positions of respective fixed pivotal points between the vehicle body and the trailing arm 5, front lower arm 6, and rear lower arm 4;

$A_1$, $B_1$, and $C_1$ are respective positions of the points A, B, and C when the rear wheel 2 is in its stationary state; and $l_1$, $l_2$, and $l_3$ are respective longitudinal distances between points B and D, points A and B, and points A and C.

The positions of respective points and values in respective relationships to be hereinafter referred to are those in plan view. The values in the relationships are all approximate ones.

Description will be made of a case in which, in bump or rebound, the rear wheel 2 is upwardly or downwardly shifted at a distance of $L_i$ (not shown) from its position of the stationary state.

In such case, the points A, B and C come to respective positions of points $A_2$, $B_2$, and $C_2$. Associated displacements $x_1$ and $y_1$ of points B and C in the inboard direction of the vehicle body depend on the geometric dimensions of front lower arm 6 and rear lower arm 4, respectively, as well as on the distance $L_i$. The front lower arm 6 is shorter than the rear lower arm 4, so that:

$$x_1 - y_1 > 0 \qquad (i).$$

Corresponding inboard displacement $z_1$ of point A is such that:

$$z_1 = x_1(l_1 + l_2)/l_1 \qquad (ii).$$

$$\text{Thus, } z_1 > x_1 \qquad (ii').$$

In comparison with the stationary state, the toe-in angle of rear wheel 2 is increased by $\theta_1$, where $$\theta_1 = \tan^{-1}[(z_1 - y_1)/l_3] \qquad (iii).$$

For comparison purpose, a special case will be examined below, in which the point A coincides with the point B in the longitudinal direction, without being forwardly offset therefrom, and also the point E is positioned at a rearward distance of $l_2$ from its position in FIG. 7. In other words, the case of $l_2 = 0$ will now be considered.

Also in this case, the point A is inboardly displaced by $x_1$ when the rear wheel 2 is upwardly or downwardly shifted by the distance $L_i$ from the stationary position. Under such conditions, the toe-in angle of rear wheel 2 is increased by $\theta_0$ in comparison with the stationary state, where $$\theta_0 = \tan^{-1}[(x_1 - y_1)/l_3] \qquad (iv).$$

Substituting $y_1$ from both sides of relationship (ii'), $$z_1 - y_1 > x_1 - y_1 \qquad (ii'').$$

From relationships (i) and (ii''), $$z_1 - y_1 > x_1 - y_1 > 0 \qquad (ii''').$$

Thus, when comparing expression (iv) with expression (iii) in consideration of relationship (ii''') as well as the characteristic of arcsine function, it so follows that:

$$\theta_1 > \theta_0 \qquad (v).$$

As will be understood from this relationship, in the independent rear wheel suspension 100, the toe-in angle increasing rate of rear wheel 2 at the time of bump and rebound is larger than that in the special case where the points A and B are coincident with each other (that is, $l_2 = 0$).

In the suspension 100 shown in FIG. 7, if the transverse dimension of front lower arm 6 is made adequately longer, the inboard displacement of rear wheel 2 has a decreased value below $x_1$. Accordingly, the toe-in angle increasing rate of rear wheel 2 in bump and rebound can be set substantially the same as the case where the points A and B coincide with each other (that is, $l_2 = 0$).

In the graph of FIG. 9, represented by a curve I is the toe angle characteristic of the independent rear wheel suspension 100 in bump and rebound of rear wheel 2. In the graph, overlapped on the axis of ordinate is a curve III representing the toe angle characteristic in bump and rebound of rear wheel 2 in the case where the points A and B coincide with each other.

In the graph of FIG. 10, curves I' and III' are characteristic curves corresponding to the curves I and III of FIG. 9, respectively. In this graph, the axis of abscissa represents the vertical shift of rear wheel 2, and the axis of ordinate, represent the toe angle variation from the stationary position of rear wheel 2.

In the foregoing description, it is out of the problem whether the rear wheels are set so as to toe in or toe out in the stationary state.

FIG. 8 is a schematically represented plan view, similar to FIG. 7, of an independent rear wheel suspension 100' according to a modified example of the foregoing embodiment of the present invention. Like parts, points, and distances are designated by like reference numerals or characters, and modified points and distances, by like reference characters with mark ('). For example, represented by reference character $B_1'$ is the position that a pivotal point B between a trailing arm 5 and a front lower arm 6 has when a rear wheel 2 is in its stationary state. The suspension 100' is different from the suspension 100 in that the pivotal point B is rearwardly (rather than forwardly) offset with respect to a pivotal point A between a knuckle 1 and the trailing arm 5, whereby the longitudinal distance $l_2$, between the points A and B is a negative value.

Description will be made of a case in which, in bump or rebound, the rear wheel 2 is upwardly or downwardly shifted at a distance of $L_i$ (not shown) from its position of the stationary state, in FIG. 8.

In such case, the points A, B and C come to respective positions of points $A_2'$, $B_2'$, and $C_2$. Corresponding inboard displacement $z_1'$ of point A is such that:

$$z_1' = x_1(l_1' + l_2')/l_1' \qquad (vi).$$

$$\text{Thus, } z_1' < x_1 \qquad (vii).$$

In comparison with the stationary state, the toe-in angle of rear wheel 2 is increased by $\theta_2$ (not shown), where $$\theta_2 = \tan^{-1}[(z_1' - y_1)/l_3] \qquad (viii).$$

As described, in the special case in which the points A and B are coincident with each other in the longitudinal direction, the toe-in angle of rear wheel 2 is increased by $\theta_0$ (not shown) in comparison with the stationary state, where $$\theta_0 = \tan^{-1}[(x_1 - y_1)/l_3] \qquad (iv).$$

Thus, when comparing expression (iv) with expression (viii) in consideration of relationship (vii) as well as the characteristic of arcsine function, it so follows that:

$$\theta_2 < \theta_0 \qquad \text{(ix)}.$$

As will be understood from this relationship, in the independent rear wheel suspension 100', the toe-in angle increasing rate of rear wheel 2 at the time of bump and rebound is smaller than that in the special case where the points A and B are coincident with each other (that is, $l_2' = 0$).

It also will be seen from expression (viii) that if $z_1' > y_1$ then $\theta_2 > 0$ or, in other words, in bump and rebound the tendency of toe angle variation in the toe-in direction of rear wheel 2 is larger than that in the stationary state. Moreover, in expression (viii), if $z_1' > y_1$ then $\theta_2 > 0$ and, therefore, in bump and rebound the tendency of toe angle variation in the toe-out direction of rear wheel 2 is larger than that in the stationary state.

In the suspension 100' shown in FIG. 8, if the transverse dimension of front lower arm 6 is made adequately smaller, the inboard displacement of rear wheel 2 has an increased value above $x_1$. Accordingly, the toe-in angle increasing rate of rear wheel 2 in bump and rebound can be set automatically the same as the case where the points A and B coincide with each other (that is, $l_2' = 0$).

In the graph of FIG. 9, represented by a curve II is the toe angle characteristic of the independent rear wheel suspension 100' in bump and rebound of rear wheel 2.

In the graph of FIG. 10, represented by a curve II' is the characteristic curve that corresponds to the curve II of FIG. 9.

In this modified example, also, it is out of the problem whether the rear wheels are set so as to toe in or out in the stationary state.

In each of the suspensions 100 and 100', the knuckle 1 is leftwardly and rightwardly swingingly pivotably attached to the trailing arm 5 so as to rotate about a substantially vertical axis 12-14, corresponding to bolts 12, 14, and the pivotal point B between the trailing arm 5 and front lower arm 6 is forwardly or rearwardly offset with respect to the pivotal point A between the knuckle 1 and the trailing arm 5. Namely, point B is offset from point A in the longitudinal direction of the vehicle. As a result, there is provided an independent rear wheel suspension which permits an increased freedom in design of rear wheel toe angle characteristic and an improved space utilization.

Additionally, the front lower arm 6 is operatively pivotably attached via such trailing arm to the knuckle 1. Accordingly, in bump and rebound of rear wheel 2, the transmission of transverse vibrations from knuckle 1 to trailing arm 5 is possibly reduced to effectively control the sympathetic vibration of trailing arm 5 in the longitudinal direction of the vehicle. Similarly, the transmission of vibrations from knuckle 1 to front lower arm 6 is possibly reduced. As a result, there is provided an independent rear wheel suspension which permits an enhanced riding comfort. Further, inasmuch as the knuckle 1 is interconnected via rubber bushes 13, 15 with trailing arm 5, and the front lower arm 6, via rubber bush 6a (actually the arm 6 is connected to the arm 5), the rubber bushes 13, 15, 6a themselves absorb vibrations, so that such transmission of vibrations as described is all the more reduced.

Such advantage of the present invention may be sufficiently achieved also in a modification in which suitable joints such as ball joints are employed in place of rubber bushes 3a, 4a, 6a, 13, 15.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What is claimed:

1. An independent rear wheel suspension (100; 100') for a vehicle, comprising:
    a trailing arm (5) extending substantially in the lonitudinal direction of the vehicle and vertically swingingly pivotably attached at a front end part (D) thereof to a body of the vehicle;
    a knuckle (1) connected to a rear end part (A) of said trailing arm (5) and rotatably supporting a rear wheel (2) of the vehicle;
    said rear end part (A) of said trailing arm (5) being connected to said knuckle (1) with a span (12a-14a) in a vertical direction;
    an upper arm (3) extending substantially in the transverse direction of the vehicle and vertically swingingly pivotably attached at an inner end part (3b) thereof to the vehicle body and at an outer end part (3a) thereof to an upper part (1a) of said knuckle (1);
    a rear lower arm (4) extending substantially in the transverse direction of the vehicle and vertically swingingly pivotably attached at an upper end part (F) thereof to the vehicle body and at an outer end part (C) thereof to said knuckle (1);
    a front lower arm (6) extending, in front of said rear lower arm (4), substantially in the transverse direction of the vehicle and vertically swingingly pivotably attached at an inner end part (E) thereof to the vehicle body and at an outer end part (B) thereof in an operative manner to said knuckle (1), said front lower arm (6) being shorter than said rear lower arm (4);
    each of said upper arm (3), said lower arm (4) and said front lower arm (6) being "I"-shaped with viewed in plan; and
    a shock absorber operatively interposed between said knuckle (1) and the vehicle body, wherein:
    said knuckle (1) is leftwardly and rightwardly swingingly pivotably attached to said trailing arm (5) so as to rotate about a substantially vertical axis (12-14) extending through said rear end part (A) of said trailing arm (5); and
    the operative pivotal point (B) between said knuckle (1) and said front lower arm (6) is offset in the longitudinal direction of the vehicle with respect to the pivotal point (A) between said knuckle (1) and said trailing arm (5).

2. An independent rear wheel suspension according to claim 1, wherein:
    the operative pivotal point (B) between said knuckle (1) and said front lower arm (6) is offset forwardly of the vehicle with respect to the pivotal point (A) between said knuckle (1) and said trailing arm (5).

3. An independent rear wheel suspension according to claim 1, wherein:

the operative pivotal point (B) between said knuckle (1) and said front lower arm (6) is offset rearwardly of the vehicle with respect to the pivotal point (A) between said knuckle (1) and said trailing arm (5).

4. An independent rear wheel suspension according to claim 1, wherein:
said outer end part (B) of said front lower arm (6) is vertically swingingly pivotably attached to said trailing arm (5).

5. An independent rear wheel suspension according to claim 1, wherein:
said knuckle (1) is pivotably attached to said trailing arm (5) via an elastic member (13, 15).

6. An independent rear wheel suspension according to claim 4, wherein:
said outer end part (B) of said front lower arm (6) is pivotably attached to said trailing arm (5) via an elastic member (6a).

* * * * *

UNITED STATES PATENT AND TRADEMARK OFFICE
CERTIFICATE OF CORRECTION

PATENT NO. : 4,832,363
DATED : May 23, 1989
INVENTOR(S) : Keiichi Mitobe

It is certified that error appears in the above-identified patent and that said Letters Patent is hereby corrected as shown below:

Column 1, line 14, change "Wishbone" to --wishbone--;
         line 31, change "this" to --that--;
         line 49, delete "and" (second occurrence);
         line 58, correct the spelling of "characteristic".
Column 2, line 31, after "substantially" add --in the transverse direction of the vehicle and vertically--.
Column 3, line 11, change "suspension" to --suspensions--;
         line 41, after "knuckle" add --1--.
Column 4, line 14, change "and to the rear part of the trailing arm 5" to --to the bolt 11--;
         line 16, after "1" delete the period and insert --and to the rear part of the trailing arm 5--.
Column 6, line 39, change "$l_2$," to --$l_2'$--.
Column 7, line 23, change "automatically" to --substantially--.
Column 8, line 35 (claim 1, line 21), change "upper" to --inner--.

Signed and Sealed this

Fifth Day of June, 1990

Attest:

HARRY F. MANBECK, JR.

Attesting Officer        Commissioner of Patents and Trademarks